(12) United States Patent
Ishibe

(10) Patent No.: US 6,731,418 B2
(45) Date of Patent: May 4, 2004

(54) MULTIBEAM SCANNING OPTICAL SYSTEM AND IMAGE FORMING APPARATUS USING THE SAME

(75) Inventor: Yoshihiro Ishibe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/101,857

(22) Filed: Mar. 21, 2002

(65) Prior Publication Data

US 2002/0163703 A1 Nov. 7, 2002

(30) Foreign Application Priority Data

Mar. 27, 2001 (JP) ........................................ 2001/090206

(51) Int. Cl.$^7$ .............................................. G02B 26/08
(52) U.S. Cl. ....................... 359/204; 359/216; 359/210; 359/211; 347/241; 347/243
(58) Field of Search ................................ 359/204, 210, 359/216–219, 211, 837; 347/241–243

(56) References Cited

U.S. PATENT DOCUMENTS

| | | | |
|---|---|---|---|
| 5,834,766 A | 11/1998 | Suhara | 250/234 |
| 5,970,034 A | 10/1999 | Sakuma et al. | 369/44.38 |
| 5,999,345 A | * 12/1999 | Nakajima et al. | 359/821 |
| 6,181,363 B1 | * 1/2001 | Satoh et al. | 347/238 |
| 6,256,132 B1 | 7/2001 | Ishibe | 359/204 |
| 6,469,772 B1 | * 10/2002 | Itabashi | 355/47 |
| 2002/0149666 A1 | * 10/2002 | Amada et al. | 347/233 |

FOREIGN PATENT DOCUMENTS

JP 7-181412 7/1995

* cited by examiner

*Primary Examiner*—James Phan
(74) *Attorney, Agent, or Firm*—Fitzpatrick, Cella, Harper & Scinto

(57) ABSTRACT

A multibeam scanning optical system includes a light source unit having a light source and a plurality of beam converting elements having a first optical system for converting a beam emitted from the light source into a divergent beam or a convergent beam, beam combining element for combining a plurality of divergent beams or convergent beams emerging from the light source unit, and causing them to emerge substantially in the same direction, a second optical system for causing the plurality of divergent beams or convergent beams combined by the beam combining element to be imaged as a linear image long in the main scanning direction, deflector having a deflecting surface at or near the imaging position of the second optical system, and for reflecting and deflecting the plurality of incident divergent beams or convergent beams in the main scanning direction, and a third optical system for causing the plurality of divergent beams or convergent beams reflected and deflected by the deflector to be imaged on a surface to be scanned. Adjusting unit is provided for adjusting the relative position of the plurality of divergent beams or convergent beams in the sub scanning direction to thereby adjust the relative imaging position of the plurality of beams in the sub scanning direction on the surface to be scanned.

12 Claims, 6 Drawing Sheets

MULTIBEAM SCANNING OPTICAL SYSTEM AND IMAGE FORMING APPARATUS USING THE SAME

BACKGROUND OF THE INVENTION

1. Field of the Invention

This invention relates to a multibeam scanning optical system and an image forming apparatus using the same, and particularly is suitable, for example, for a laser beam printer (LBP), a digital copying machine or the like using a plurality of light sources as a light source to achieve a high speed and high recording density.

2. Related Background Art

In an image forming apparatus using a multibeam scanning optical system applied to a laser beam printer, a digital copying machine or the like, a plurality of beams emitted from a plurality of different light emitting points (laser beam sources) are directed as a plurality of light spots to different positions separate from one another in a sub scanning direction on the surface of a recording medium such as a photosensitive member which is a surface to be scanned, by a common multibeam scanning optical system comprised of a light deflector such as a rotary polygon mirror and an fθ lens or the like, and the surface of the recording medium is scanned at a time in a main scanning direction to thereby effect the recording of image information.

In such a conventional image forming apparatus, the distance in the sub scanning direction between adjacent spots scanned at a time, in other words, the scanning line pitch by the plurality of spots, must be adjusted with good accuracy.

Also, in recent image forming apparatuses, it is intended to make the resolution of an output image variable, and from such a point of view, it is desirable that the width of a plurality of scanning line pitches scanned at a time on the surface of a recording medium in the main scanning direction can be changed.

Further, recently, high recording density and a high-speed output have been more required, and it has become necessary to increase the number of the light emitting points of a multibeam scanning optical system in an image forming apparatus to 2, 3, 4, . . . .

Heretofore, to adjust or change the scanning line pitch by a plurality of spots, a light source unit comprised of a plurality of light sources and a beam combining prism or the like has been rotated about the optical axis of an optical system in a plane perpendicular to the optical axis. A multibeam scanning apparatus of this kind is proposed, for example, in Japanese Patent Application Laid-Open No. 7-181412.

The adjusting method for the scanning line pitch in the above-mentioned publication, however, is of a construction in which the light source unit comprised of a plurality of light sources and a beam combining prism or the like is rotated about the optical axis of the optical system in the plane perpendicular to the optical axis and therefore, suffers from the problem that the scanning line pitch is liable to vary for mechanical vibration or the like. Also, the laser beam sources such as semiconductor lasers are fixed to a movable portion, and this also leads to the problem that stability to environmental fluctuations (e.g. changes in temperature, etc.) lacks and the pitch interval is liable to change with the environmental fluctuations.

SUMMARY OF THE INVENTION

It is an object of the present invention to provide a multibeam scanning optical system witch is strong against mechanical vibration or the like and suffers little from pitch fluctuation and which is excellent in environmental stability, and an image forming apparatus using the same.

It is a further object of the present invention to provide a multibeam scanning optical system in which at least one light source is comprised of a monolithic multibeam laser having a plurality of light emitting points to thereby cope with the requirement for a higher speed and a higher quality of image, and an image forming apparatus using the same.

In one aspect of the invention, a multibeam scanning optical system comprises a light source unit having a light source and a plurality of beam converting means having a first optical system for converting a beam emitted from said light source into a divergent beam or a convergent beam, beam combining means for combining a plurality of divergent beams or convergent beams emerging from said light source unit and causing them to emerge substantially in the same direction, a second optical system for causing the plurality of divergent beams or convergent beams combined by said beam combining means to be imaged as a linear image long in the main scanning direction, deflecting means having a deflecting surface at or near the imaging position of said second optical system, and for reflecting and deflecting the plurality of incident divergent beams or convergent beams in the main scanning direction, and a third optical system for causing the plurality of divergent beams or convergent beams reflected and deflected by said deflecting means to be imaged on a surface to be scanned, and adjusting means for adjusting the relative position of said plurality of divergent beams or convergent beams in the sub scanning direction to thereby adjust the relative imaging position of said plurality of beams in the sub scanning direction on the surface to be scanned.

In further aspect of the multibeam scanning optical system, said beam combining means has a beam combining prism.

In further aspect of the multibeam scanning optical system, said adjusting means rotates said beam combining prism about an axis lying in the main scanning cross section and substantially parallel to the surface to be scanned.

In further aspect of the multibeam scanning optical system, said adjusting means moves at least one of said plurality of beam converting means in the sub scanning direction.

In further aspect of the multibeam scanning optical system, the distances from the principal point of said third optical system on the deflecting means side in the main scanning cross section to the natural converging points of said plurality of divergent beams or convergent beams are equal to each other.

In further aspect of the multibeam scanning optical system, a light source constituting an element of at least one of said plurality of beam converting means is comprised of a monolithic multibeam laser having a plurality of light emitting points.

In further aspect of the multibeam scanning optical system, the adjustment of the relative imaging position of the plurality of beams emitted from the plurality of light emitting points of said monolithic multibeam laser in the sub scanning direction on said surface to be scanned is effected by rotating said monolithic multibeam laser about an optical axis.

In further aspect of the multibeam optical scanning apparatus, the multibeam scanning optical system is contained in a housing.

In another aspect of the invention, an image forming apparatus comprises the foregoing multibeam optical scanning apparatus, a photosensitive member disposed on said surface to be scanned, a developing device for developing as a toner image an electrostatic latent image formed on said photosensitive member by a beam scanned by said multibeam optical scanning apparatus, a transferring device for transferring the developed toner image to a transfer material, and a fixing device for fixing the transferred toner image on the transfer material.

In another aspect of the invention, an image forming apparatus comprises the foregoing multibeam optical scanning apparatus and a printer controller for converting code data input from an external device into an image signal and inputting it to said optical scanning apparatus.

DESCRIPTION OF THE PREFERRED EMBODIMENTS

Embodiment 1

Figure 1:
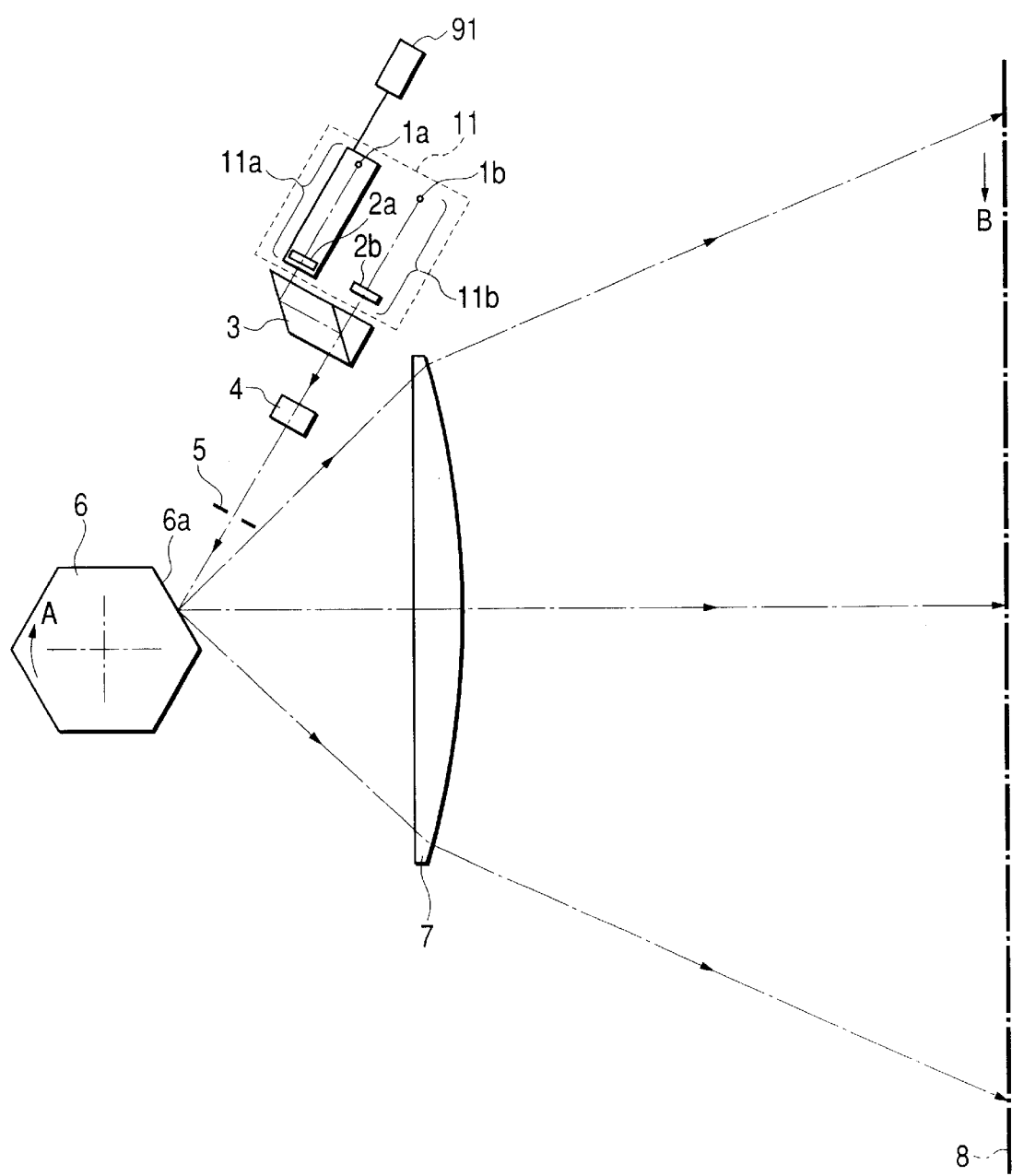
FIG. 1 is a schematic view of the essential portions of a multibeam scanning optical system according to Embodiment 1 of the present invention.

FIG. 1 is a schematic view of the essential portions of Embodiment 1 of the multibeam scanning optical system of the present invention.

Herein, a plane formed by the optical axis of an fθ lens system and a beam deflected by a light deflector is defined as the main scanning cross section, and a plane containing the optical axis of the fθ lens system and orthogonal to the main scanning cross section is defined as the sub scanning cross section.

In FIG. 1, the reference numeral 11 designates a light source unit having two beam converting means 11a and 11b. The beam converting means 11a and 11b have light sources (laser beam sources) 1a and 1b, respectively, comprising semiconductor lasers, and converting elements (condensing lenses) 2a and 2b, respectively, as first optical systems for converting beams emitted from the laser beam sources 1a and 1b into convergent beams or divergent beams (in the present embodiment, convergent beams). The focal lengths of the converting elements 2a and 2b differ from each other.

While in the present embodiment, there is shown a two-beam scanning optical apparatus using two laser beam sources, the number of the laser beam sources may be three or more. That is, the number of the beam converting means may be three or more.

The reference numeral 3 denotes beam combining means comprising a beam combining prism, and it combines the two beams converted into convergent beams so as to emerge substantially in the same direction. The reference numeral 4 designates a cylindrical lens as a second optical system having predetermined refractive power only in the sub scanning direction. The reference numeral 5 denotes an aperture stop for shaping the beam emerging from the cylindrical lens 4 into an optimum beam shape.

Each of the light source unit 1, the beam combining prism 3, the cylindrical lens 4 and the aperture stop 5 constitutes an element of incidence optical means.

The reference numeral 6 designates a light deflector as deflecting means, which comprises, for example, a rotary polygon mirror and is rotated at a constant speed in the direction of arrow A by driving means (not shown) such as a motor.

The reference numeral 7 denotes an fθ lens system having the fθ characteristic as a third optical system, and it comprises a single fθ lens and causes the two beams deflected by the light deflector 6 to be imaged into a spot shape on the surface of a photosensitive member 8 as a surface to be scanned. The fθ lens 7 brings the deflecting surface (reflecting surface) 6a of the light deflector 6 or the vicinity thereof and the surface of the photosensitive member 8 or the vicinity thereof into a conjugate relation in the sub scanning cross section to thereby have the inclination correcting function.

The reference numeral 8 designates a photosensitive member (photosensitive drum) as a recording medium. The reference numeral 91 denotes adjusting means which makes the beam converting means 11a movable in the sub scanning direction.

In the present embodiment, the two beams light-modulated in conformity with image information and emitted from the light sources 1a and 1b are converted into convergent beams by the corresponding converting elements 2a and 2b, respectively, and are combined by the beam combining prism 3 so as to emerge substantially in the same direction. The two beams (convergent beams) combined by the beam combining prism 3 and emerging therefrom enter the cylindrical lens 4. Of the beams having entered the cylindrical lens 4, the beams in the main scanning cross section emerge in their intact state and pass through the aperture stop 5 (are partly intercepted). Also, the beams in the sub scanning cross section converge and pass through the aperture stop 5 (are partly intercepted) and are formed as substantially linear images (linear images long in the main scanning direction) on the deflecting surface 6a of the light deflector 6. The two beams reflected and deflected by the deflecting surface 6a of the light deflector 6 are imaged into a spot shape on the surface of the photosensitive member 8 by the fθ lens 7, and optically scan on the surface of the photosensitive member 8 at equal speeds in the direction of arrow B (the main scanning direction) by the light deflector 6 being rotated in the direction of arrow A. Thereby, two scanning lines are formed at a time on the surface of the photosensitive member 8 which is a recording medium, and image recording is effected.

Figure 2:
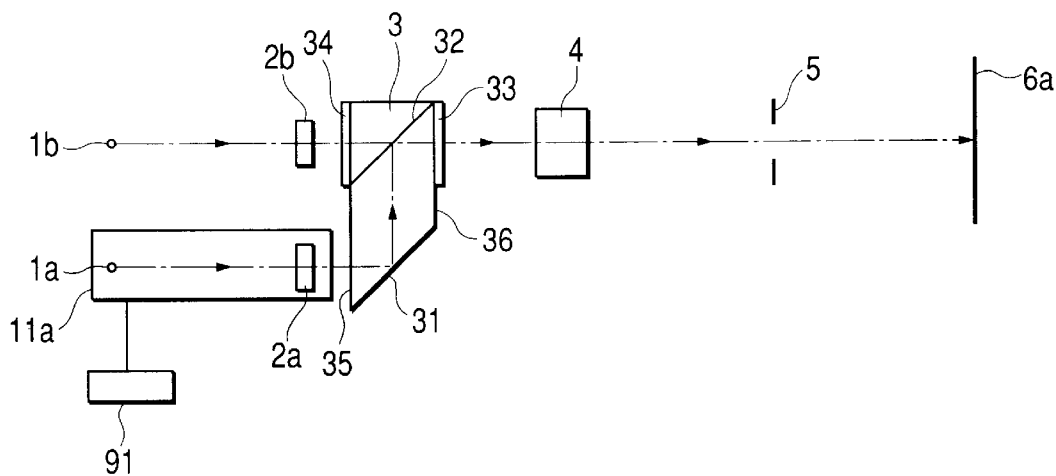
FIG. 2 is a main scanning cross-sectional view of the light source means to the light deflector of the multibeam scanning optical system according to Embodiment 1 of the present invention.
Figure 3:
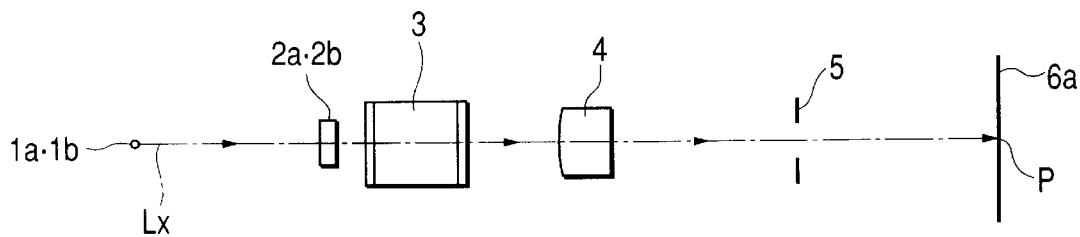
FIG. 3 is a sub scanning cross-sectional view of the light source means to the light deflector of the multibeam scanning optical system according to Embodiment 1 of the present invention.

FIG. 2 is a cross-sectional view of essential portions (a main scanning cross-sectional view) of the laser beam source to the deflecting surface of the light deflector of the multibeam scanning optical system of FIG. 1 in the main scanning direction, and FIG. 3 is a cross-sectional view of essential portions (a sub scanning cross-sectional view) of the laser beam source to the deflecting surface of the light deflector of the multibeam scanning optical system of FIG. 1 in the sub scanning direction. In FIGS. 2 and 3, the same elements as the elements shown in FIG. 1 are given the same reference characters.

In FIGS. 2 and 3, the two laser beam sources 1a and 1b are arranged separately from each other in the main scanning cross section, and the two beams emitted from the laser beam sources 1a and 1b are converted into convergent beams by the corresponding converting elements 2a and 2b, and thereafter enter the beam combining prism 3. The two beams emitted from the laser beam sources 1a and 1b are both linearly polarized lights of which the polarization directions are the same.

The beam emitted from the laser beam source 1a and converted into a convergent beam by the converting element 2a enters the beam combining prism 3 from the incidence surface 35 thereof, is reflected by a surface 31, is further reflected by the polarizing beam splitter surface 32 of the prism 3, passes through a quarter wavelength plate 33 disposed on the exit surface 36 of the prism 3, and is converted into circularly polarized light and emerges.

The beam emitted from the laser beam source 1b and converted into a convergent beam by the converting element 2b passes through a half wavelength plate 34 disposed on the incidence surface 35 of the beam combining prism 3, has its polarization direction rotated by 90°, is transmitted through the polarizing beam splitter surface 32 of the beam combining prism 3, passes through the quarter wavelength plate 33 disposed on the exit surface 36 of the beam combining prism 3 and is converted into circularly polarized light.

The two beams both converted into circularly polarized lights are converged only in the sub scanning direction by the cylindrical lens 4, and have their beam widths limited by the aperture stop 5, and are imaged into a focal line shape long in the main scanning direction on or near the deflecting surface 6a of the light deflector 6.

When the laser beam sources 1a and 1b are arranged in the main scanning cross section, as can be seen from FIG. 3, the two beams emitted from the laser beam sources 1a and 1b are imaged at the same position P in the sub scanning direction on or near the deflecting surface 6a of the light deflector 6.

Here, consider a case where the beam emitted from the laser beam source 1a has been parallel-moved in the sub scanning direction.

Figure 4:
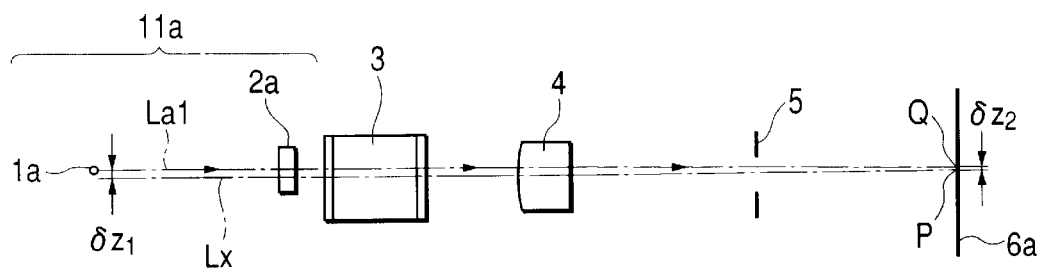
FIG. 4 illustrates a method of adjusting the pitch interval in the sub scanning direction in the multibeam scanning optical system according to Embodiment 1 of the present invention.

FIG. 4 is a sub scanning cross-sectional view when the laser beam source 1a and the converting element 2a corresponding thereto have been moved in the sub scanning direction (upwardly as viewed in FIG. 4) by the same amount $\delta z_1$ relative to the center axis Lx.

In FIG. 4, the convergent beam La1 having emerged $\delta z_1$ above from the center axis Lx passes through the beam combining prism 3, is converged only in the sub scanning direction by the cylindrical lens 4, has its beam width limited by the aperture stop 5, and is imaged into a focal line shape on or near the deflecting surface 6a of the light deflector 6 at a point Q upwardly separate by $\delta z_2$ in the sub scanning direction relative to a reference point P.

Even if the beam emerging from the converting element 2a, when it is a parallel beam, deviates in the sub scanning direction, the imaging position in the sub scanning direction on or near the deflecting surface 6a of the light deflector 6 does not change, and it can be readily understood that the beam is always imaged at the point P.

In the present embodiment, the beam emerging from the converting element 2a is made into a convergent beam, whereby the convergent beam emerging $\delta z_1$ from above the center axis Lx is imaged on or near the deflecting surface 6a of the light deflector 6 at the position Q upwardly separate by $\delta z_2$ in the sub scanning direction from the reference point P. The beam imaged at the position Q is then imaged on the surface to be scanned not shown, at a position downwardly separate by a distance $\delta z_3$ in the sub scanning direction as compared with the reference point P, by a scanning optical system, not shown.

That is, if the beam emerging from the converting element 2a is made into a convergent beam, the beam emerging from the converting element 2a with the laser beam source 1a and the converting element 2a displaced by the same amount is displaced in the sub scanning direction, whereby the imaging position in the sub scanning direction on the surface 8 to be scanned can be adjusted.

Specifically, design is made such that the beam converting means 11a comprising the laser beam source 1a and the converting element 2a is moved in the sub scanning direction (a vertical direction as viewed in FIG. 4) by adjusting means 91, and the relative imaging position in the sub scanning direction on the surface 8 to be scanned is adjusted to thereby adjust (or change) the width of the scanning line pitch in the sub scanning direction on the surface 8 to be scanned. While in the present embodiment, the beam converting means 11a is moved in the scanning direction, the beam converting means 11b or the beam converting means 11a and the beam converting means 11b can be relatively moved in the sub scanning direction to thereby adjust (or change) the scanning line pitch in the sub scanning direction on the surface 8 to be scanned.

Figure 5:
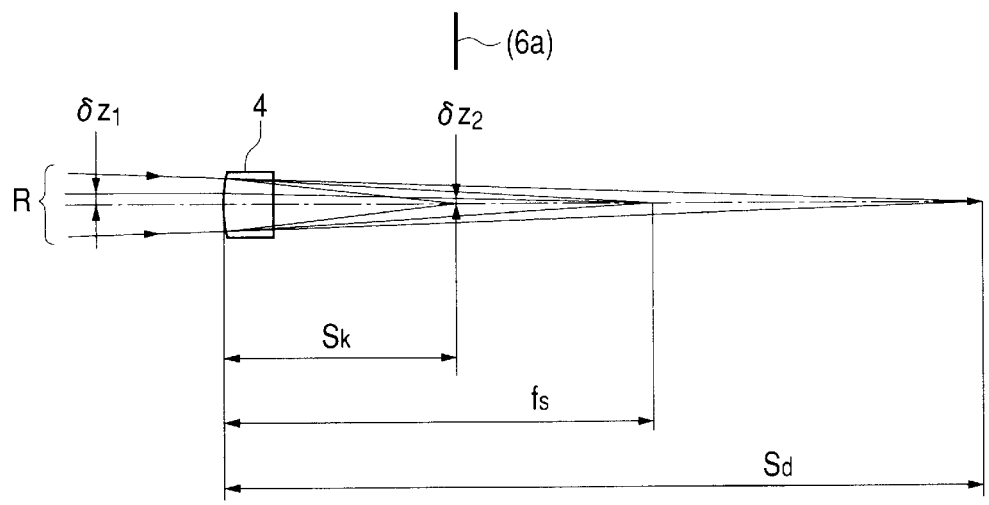
FIG. 5 illustrates the principle of the adjustment of the pitch interval in the sub scanning direction in the multibeam scanning optical system according to Embodiment 1 of the present invention.

Reference is now had to FIG. 5 to describe the principle on which, when the beam emerging from the converting element 2a is made into a convergent beam, the convergent beam emerging from $\delta z_1$ above the converting element 2a is imaged on or near the deflecting surface 6a of the light deflector 6 at the position Q upwardly separate by the distance $\delta z_2$ in the sub scanning direction.

FIG. 5 is a sub scanning cross-sectional view illustrating the principle of the adjustment of the pitch interval in the sub scanning direction in the multibeam scanning optical system of FIG. 1. In FIG. 5, the letter R represents the convergent beam emerging from the converting element 2a. The reference numeral 4 designates the cylindrical lens, and the beam entering the cylindrical lens 4, when it does not pass through the cylindrical lens 4, is such a convergent beam as is imaged at a position of a distance Sd from the cylindrical lens 4. When the focal length of the cylindrical lens 4 in the sub scanning cross section is defined as fs, the convergent beam having entered the cylindrical lens 4 is imaged at a position of a distance Sk from the cylindrical lens 4 (this position is the deflecting surface 6a).

Here, the relation that $$\frac{1}{Sk} = \frac{1}{Sd} + \frac{1}{fs}$$

is established among Sd, fs and Sk.

When the beam entering the cylindrical lens 4 has entered with a deviation of a distance $\delta z_1$ in the sub scanning direction, the amount of deviation $\delta z_2$ of the beam in the sub scanning direction at the imaging point position in the sub scanning direction is $$\delta z_2 = \frac{fs - Sk}{fs} \times \delta z_1 = \frac{Sk}{Sd} \times \delta z_1$$

because as is apparent from FIG. 5, the relation that $$\frac{\delta z_1}{fs} = \frac{\delta z_2}{fs - Sk}$$

is established.

While here, the beam entering the cylindrical lens 4 is described as a convergent beam, it can be readily understood from the foregoing description that likewise in the case of a divergent beam, the imaging point position in the sub scanning direction can be deviated (in the case of a divergent beam, the direction of deviation becomes opposite).

As described above, in the present embodiment, design is made such that the beams emitted from the laser beam sources 1a and 1b are converted into convergent beams by the corresponding converting elements 2a and 2b, and one 11a of the beam converting means 11a and 11b comprised of the light sources 1a, 1b and the converting elements 2a, 2b is moved in the sub scanning direction (vertically as viewed in FIG. 5) to thereby adjust the relative imaging position in the sub scanning direction on the surface 8 to be scanned, whereby the width of the scanning line pitch in the sub scanning direction on the surface 8 to be scanned is adjusted (or changed). Therefore, as compared with the conventional construction in which a light source unit comprised of a plurality of light sources and a beam combining prism or the like is rotated about the optical axis of the optical system in a plane perpendicular to the optical axis, it is possible to adopt a construction in which the number of parts displaced in case of adjustment is small and which is strong against mechanical vibration, and there can be provided a multibeam scanning optical system which is free of changes in the pitch in the sub scanning direction and copes with the requirement for a higher quality of image.

In the present embodiment, the above-described multibeam scanning optical system is contained in a housing (a multibeam optical scanning apparatus). While in the present embodiment, the fθ lens system is comprised of a lens, this is not restrictive, but the fθ lens system may be comprised of two or more lenses.

Embodiment 2

Figure 6:
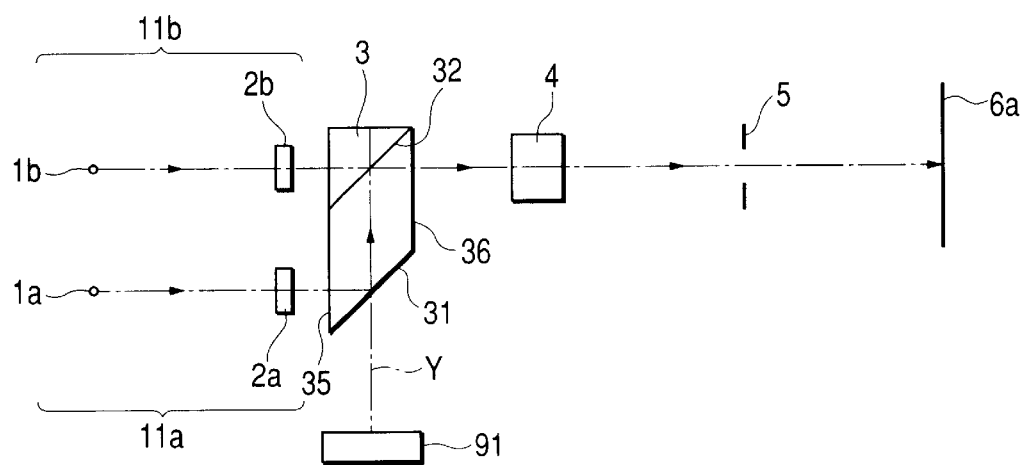
FIG. 6 is a main scanning cross-sectional view of the light source means to the light deflector of a multibeam scanning optical system according to Embodiment 2 of the present invention.
Figure 7:
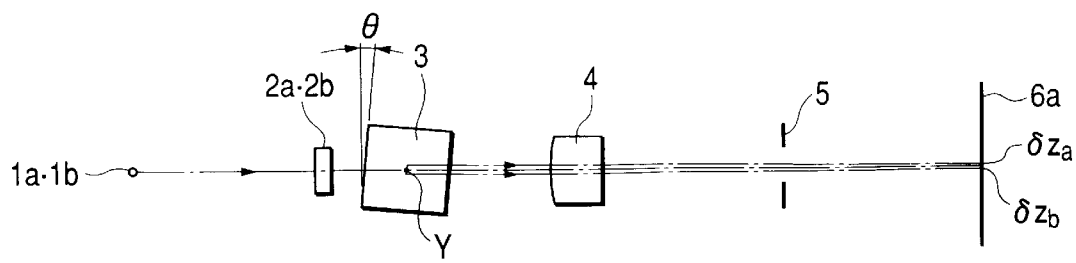
FIG. 7 is a sub scanning cross-sectional view of the light source means to the light deflector of the multibeam scanning optical system according to Embodiment 2 of the present invention.

FIG. 6 is a main scanning cross-sectional view of the laser beam source to the deflecting surface of the light deflector of Embodiment 2 of the multibeam scanning optical system of the present invention. FIG. 7 is a sub scanning cross-sectional view of the portions of FIG. 6. In FIGS. 6 and 7, the same elements as the elements shown in FIGS. 2 and 3 are given the same reference characters.

The difference of the present embodiment from the afore-described Embodiment 1 is that by the adjusting means 91, the beam combining prism 3 is rotated about an axis (rotary axis) Y lying in the main scanning cross section and substantially parallel to the surface to be scanned, to thereby adjust the relative imaging position in the sub scanning direction on the surface 8 to be scanned, whereby the scanning line pitch in the sub scanning direction on the surface 8 to be scanned is adjusted (or changed). In the other points, the construction and optical action of the present embodiment are substantially similar to those of Embodiment 1, whereby there is obtained a similar effect.

That is, in the present embodiment, design is made such that the beam combining prism 3 is rotated about the axis Y lying in the main scanning cross section and substantially parallel to the surface to be scanned to thereby adjust (or change) the relative imaging position (scanning line pitch) of the two beams in the sub scanning direction on the surface to be scanned.

In the present embodiment, as shown in FIG. 7, the beam combining prism 3 is rotated by an angle θ about the axis Y. Thereby, the beam emitted from the laser beam source 1b and converted into a convergent beam by the converting element 2b enters the cylindrical lens 4 while being downwardly deviated by $\delta z_b$ (a negative value) in the sub scanning direction by the refracting action of the incidence surface and exit surface of the beam combining prism 3.

On the other hand, the beam emitted from the light source 1a and converted into a convergent beam by the converting element 2a enters the cylindrical lens 4 while being upwardly deviated by $\delta z_a$ (a positive value) in the sub scanning direction by the refracting action of the incidence surface and exit surface of the beam combining prism 3 and the reflecting action of the polarizing beam splitter surface 32. That is, the beam converted into a convergent beam by the converting element 2a is downwardly refracted by the incidence surface 35 of the beam combining prism 3. Next, it is upwardly reflected by the surface 31 of the beam combining prism 3. Further, it is downwardly reflected by the polarizing beam splitter surface 32 of the beam combining prism 3, and lastly is refracted by the exit surface 36 of the beam combining prism 3, and finally emerges from the beam combining prism 3 at the same angle as that when it enters the incidence surface 35 of the beam combining prism 3.

At this time, the beam emerging from the beam combining prism 3 emerges while being upwardly deviated by $\delta z_a$ (a positive value) in the sub scanning direction because the distance from the surface 31 to the polarizing beam splitter surface 32 of the beam combining prism 3 is long. Finally, the two convergent beams become deviated relative to each other by $\delta z_1 = \delta z_b - \delta z_a$ in the sub scanning direction. This amount of deviation $\delta z_1$ is varied by the angle of rotation of the beam combining prism 3.

In the present embodiment, design is made such that only the beam combining prism 3 is rotated about the axis Y lying in the main scanning cross section and substantially parallel to the surface to be scanned, and the angle of rotation thereof is adjusted to thereby adjust (or change) the scanning line pitch in the sub scanning direction on the surface 8 to be scanned.

By adopting such a construction, as compared with the conventional construction in which a light source unit comprised of a plurality of light sources and a beam combining prism or the like is rotated about the optical axis of an optical system in a plane perpendicular to the optical axis, the part to be displaced in case of adjustment can be only the beam combining prism 3, and it becomes possible to adopt a construction which is simplified in adjusting mechanism and strong against mechanical vibration.

Further, when the beam combining prism 3 is to be rotated as in the present embodiment, the value of the amount of deviation $\delta z_1$ of the two convergent beams relative to the angle of rotation of the beam combining prism 3 in the sub scanning direction is small, in other words, the sensitivity of adjustment is small and therefore, it becomes possible to achieve the increased efficiency of the adjusting work and further, it becomes possible to provide a construction excellent in stability to environmental fluctuations (e.g. temperature change, etc.).

While again in the present embodiment, the beams emerging from the converting elements 2a and 2b are described as convergent beams, it is of course possible to obtain a similar effect even if they are divergent beams.

Embodiment 3

Figure 8:
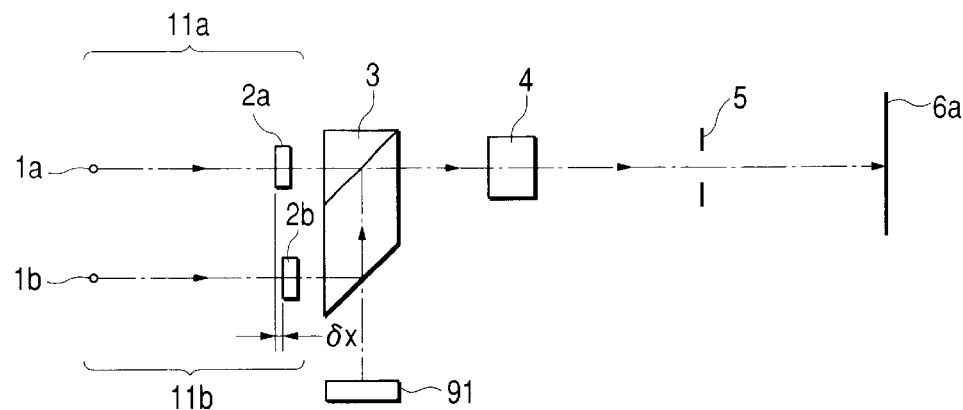
FIG. 8 is a main scanning cross-sectional view of the light source means to the light deflector of a multibeam scanning optical system according to Embodiment 3 of the present invention.

FIG. 8 is a main scanning cross-sectional view of the laser beam sources to the deflecting surface of the light deflector of Embodiment 3 of the multibeam scanning optical system of the present invention. In FIG. 8 the same elements as the elements shown in FIG. 2 are given the same reference characters.

The difference of the present embodiment from the aforedescribed Embodiment 1 or Embodiment 2 is that the converting element 2b constituting an element of the beam converting means 11b is disposed while being more deviated by a predetermined amount $\delta x$ toward the beam combining prism 3 side than the converting element 2a constituting an element of the beam converting means 11a. In the other points, the construction and optical action of the present embodiment are substantially similar to those of Embodiment 1 or Embodiment 2, whereby there is obtained a similar effect.

That is, while in the present embodiment, the laser beam sources 1a and 1b are disposed at the same positions in the direction of the optical axis, the converting element 2b is disposed while being more deviated by a predetermined amount $\delta x$ toward the beam combining prism 3 side than the converting element 2a.

Figure 9:
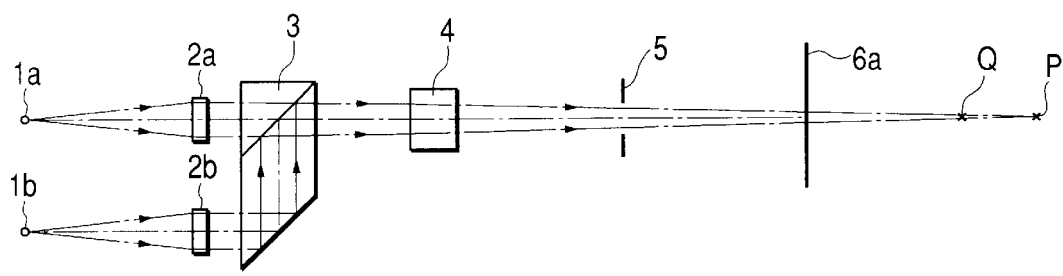
FIG. 9 illustrates that the distances to the natural converging points of convergent beams differ from each other.

Again in the present embodiment, the beams emerging from the converting elements 2a and 2b are convergent beams. Considering the optical path length along which the two beams emitted from the laser beam sources 1a and 1b are combined by the beam combining prism 3 via the converting elements 2a and 2b, and pass through the scanning optical system, not shown, and arrive at the surface 8 to be scanned, the beam emitted from the laser beam source 1b becomes longer in the optical path length by an amount reflected in the beam combining prism 3 than the beam emitted from the laser beam source 1a. In this case, if as shown, for example, in FIG. 9, the distances from the laser beam sources 1a and 1b to the converting elements 2a and 2b, respectively, are made equal to each other, when the focal lengths of the converting elements 2a and 2b are the same, the distances to the natural converging points of the two convergent beams become different from each other.

Specifically, the natural converging point P of the beam emerging from the converting element 2a deviates farther, as viewed from the laser beam sources 1a and 1b, than the natural converging point Q of the beam emerging from the converting element 2b. If the distances from the principal point on the light deflector side (the object side) of the scanning optical system to the natural converging points of the two beams are not made coincident with each other, the imaging positions of the two beams in the direction of the optical axis will not coincide with each other and therefore, if these beams are imaged by the scanning optical system, there will occur the inconvenience that deviation occurs between the imaging positions of the two beams on the surface 8 to be scanned in the direction of the optical axis. Here, the natural converging point is a position at which the convergent beam emerging from the converting element 2a or 2b is imaged into a spot shape when it does not pass through the fθ lens 7. Also, when the beam emerging from the converting element 2a or 2b is a divergent beam, the natural converging point is the position of the virtual image of the point at which the beam is imaged into the spot shape.

So, in the present embodiment, the light sources 1a and 1b are disposed at the same position in the direction of the optical axis and also, the converting element 2b is disposed while being more deviated by a predetermined amount $\delta x$ toward the beam combining prism 3 side than the converting element 2a. Thereby the distances from the principal point on the light deflector side of the scanning optical system to the natural converging points of the two convergent beams are made coincident with each other, and the two imaging positions on the surface 8 to be scanned in the direction of the optical axis are made coincident with each other.

While in the present embodiment, the light sources 1a and 1b are disposed at the same position in the direction of the optical axis and the converting element 2b is disposed while being more deviated by the predetermined amount $\delta x$ toward the beam combining prism 3 side than the converting element 2a, whereby the distances from the principal point on the light deflector side of the scanning optical system to the natural converging points of the respective beams are made coincident with each other, this is not restrictive, but for example, the converting elements 2a and 2b may be disposed at the same position in the direction of the optical axis and the laser beam source 1b may be disposed while being more deviated by a predetermined amount in a direction away from the beam combining prism 3 side than the laser beam source 1a to thereby obtain a similar effect. Also, the converting element 2b and the laser beam source 1b may be disposed while being deviated by a predetermined amount relative to the converting element 2a and the laser beam source 1a to thereby obtain a similar effect.

In the present embodiment, the adjustment (or changing) of the scanning line pitch in the sub scanning direction on the surface 8 to be scanned is effected by an adjusting method equal to that in the aforedescribed Embodiment 1 or Embodiment 2.

Again in Embodiment 3, the beams emerging from the converting elements 2a and 2b are convergent beams, but even when they are divergent beams, it is possible to obtain a similar effect.

Embodiment 4

Figure 10:
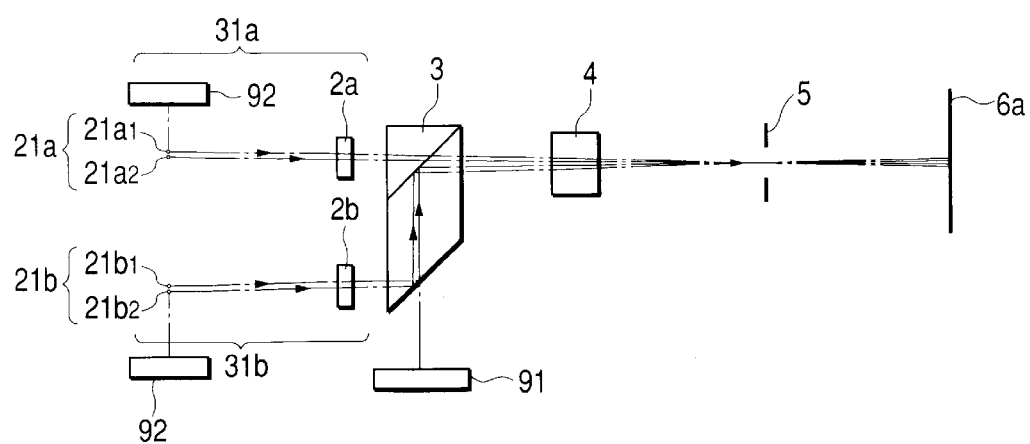
FIG. 10 is a main scanning cross-sectional view of the light source means to the light deflector of a multibeam scanning optical system according to Embodiment 4 of the present invention.

FIG. 10 is a main scanning cross-sectional view of the laser beam source to the deflecting surface of the light deflector of Embodiment 4 of the multibeam scanning optical system of the present invention. In FIG. 10, the same elements as the elements shown in FIG. 2 are given the same reference characters.

The difference of the present embodiment from the aforedescribed Embodiment 2 is that laser beam sources 21a and 21b constituting the elements of beam converting means 31a and 31b are comprised of monolithic multibeam lasers having a plurality of light emitting points, and by the adjusting means 92, the monolithic multibeam lasers 21a and 21b are rotated about the optical axis to thereby adjust (or change) the scanning line pitch in the sub scanning direction on the surface to be scanned. In the other points, the construction and optical action of the present embodiment are substantially similar to those of Embodiment 2, whereby a similar effect is obtained.

That is, in the present embodiment, the laser beam sources 21a and 21b are comprised of monolithic multibeam lasers each having a plurality of light emitting points (21a1, 21a2; 21b1, 21b2).

In the aforedescribed Embodiments 1 to 3, the respective laser beam sources 1a and 1b use single beam lasers each comprising a single light emitting point (light source). By adopting such construction, it is sufficiently possible to obtain high recording density and a high-speed output, but hereafter, higher recording density and a higher-speed output are required. To meet such requirements, it becomes necessary to increase the number of light emitting points, because the number of revolutions of the light deflector is limited. Here, if three or more beams emerging from a single beam laser comprising a single light emitting points are to be combined, a combining mechanism therefore will become complicated and become weak against mechanical vibration and at the same time, the adjustment of the scanning line pitch corresponding to each beam will become very much complicated.

So, in the present embodiment, as described above, the laser beam sources 21a and 21b are comprised of monolithic multibeam lasers each having a plurality of light emitting points (21a1, 21a2; 21b1, 21b2).

Figure 11:
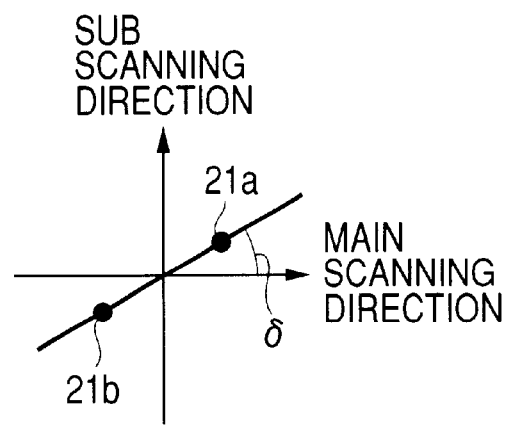
FIG. 11 shows the arrangement of the light emitting points of one light source of the multibeam scanning optical system according to Embodiment 4 of the present invention.

Each of the monolithic multibeam lasers 21a and 21b is disposed while being inclined at a predetermined angle δ with respect to the main scanning direction as shown in FIG. 11, and by adjusting the angle δ, the intervals among the respective scanning lines in the sub scanning direction on the surface to be scanned are adjusted in accordance with the recording density.

The monohithic multibeam lasers 21a and 21b are rotated about the optical axis to thereby accurately effect the adjustment (or changing) of the pitch interval in the sub scanning direction, whereafter they are fixed.

Figure 12:
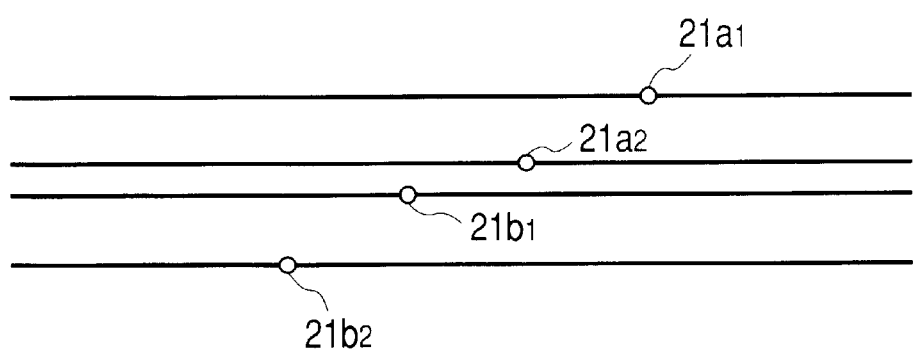
FIG. 12 shows the imaging position of the multibeam scanning optical system according to Embodiment 4 of the present invention on a surface to be scanned.

When in this state, the imaging positions of the beams emitted from the light emitting points (21a1, 21a2; 21b1, 21b2) on the surface to be scanned are such as shown in FIG. 12 wherein relative deviations are left between the imaging positions of the light emitting points 21a1, 21a2 and the imaging positions of the light emitting points 21b1, 21b2.

So, in the present embodiment, design is made such that these relative deviations are adjusted (or changed) by rotating only the beam combining prism 3 about the axis Y lying in the main scanning cross section and substantially parallel to the surface to be scanned by the adjusting means 91 as in the aforedescribed Embodiment 2, for instance (the adjusting method shown in Embodiment 1 may be used for this adjustment of the relative deviations).

If such a construction is adopted, the combining mechanism can intactly use the beam combining prism shown in the aforedescribed Embodiments 1 to 3, and it is possible to adopt a construction which is strong against mechanical vibration, and it becomes also possible to provide a construction which is excellent in stability to environmental fluctuations.

Also, if in the conventional construction wherein the light source unit comprised of a plurality of light sources and a beam combining prism or the like is rotated about the optical axis of the optical system in a plane perpendicular to the optical axis, the relative deviations between the imaging positions of the light emitting points 21a1, 21a2 and the imaging positions of the light emitting points 21b1, 21b2 are adjusted, the already adjusted imaging positions of the light emitting point 21a1 and the light emitting point 21a2, and the light emitting point 21b1 and the light emitting point 21b2 (the pitch interval in the sub scanning direction) will change and the necessity of adjusting them again will occur.

In contrast, in the present embodiment, if the adjusting method as described above is adopted, even if the relative deviations between the imaging positions of the light emitting points 21a1, 21a2 and the imaging positions of the light emitting points 21b1, 21b2 are adjusted, the already adjusted imaging positions of the light emitting point 21a1 and the light emitting point 21a2, and the light emitting point 21b1 and the light emitting point 21b2 (the pitch interval in the sub scanning direction) will not change, and this also leads to the effect that the simplification of the adjusting step can be achieved.

While in the present embodiment, both of the two laser beam sources 21a and 21b are comprised of monolithic multibeam lasers, one of them may be comprised of a monolithic multibeam laser.

[Image Forming Apparatus]

Figure 13:
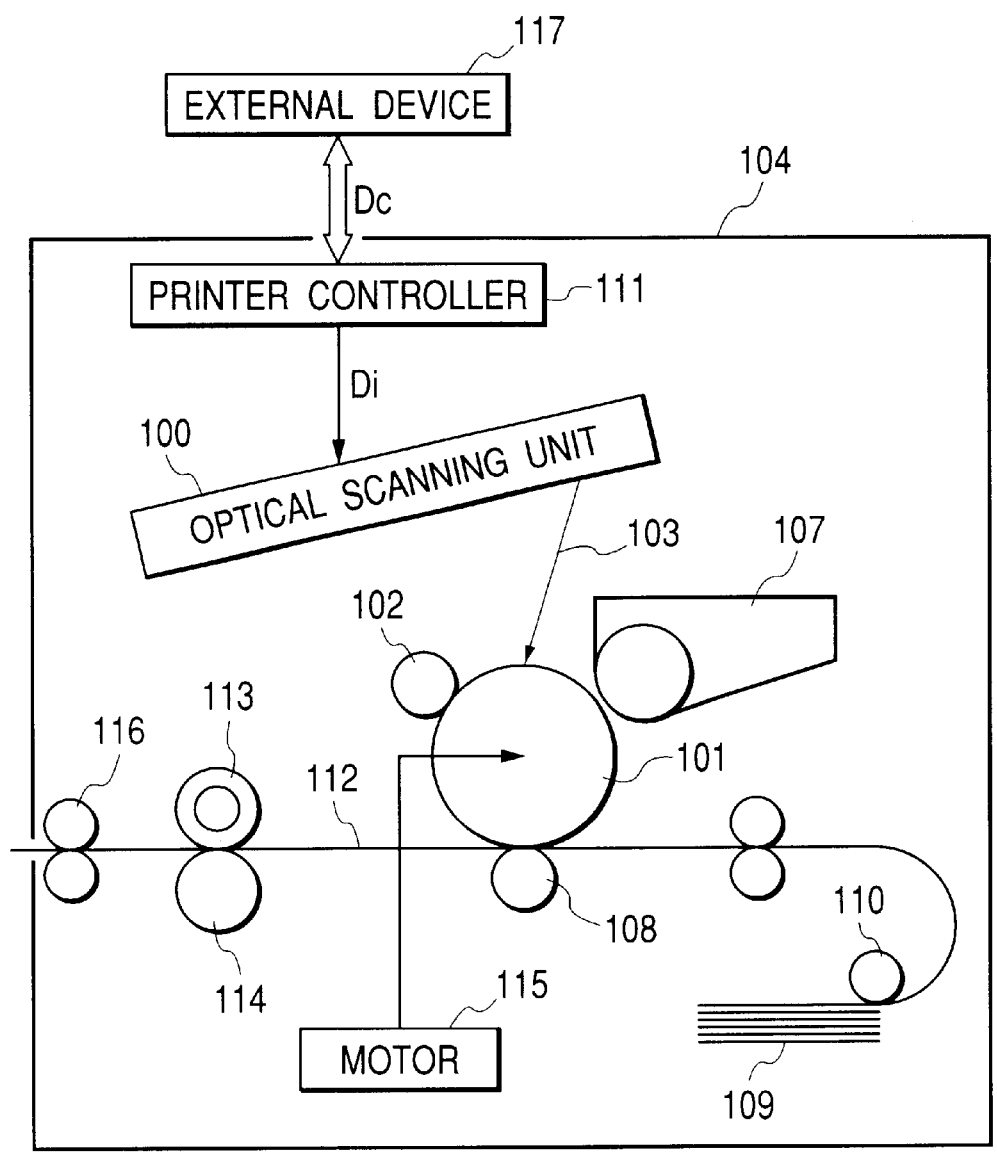
FIG. 13 is a cross-sectional view of essential portions in the sub scanning direction showing an example of the construction of an image forming apparatus (electrophotographic printer) using the optical scanning apparatus of the present invention.

FIG. 13 is a cross-sectional view of essential portions in the sub scanning direction showing an embodiment of an image forming apparatus (an electrophotographic printer) using the multibeam scanning optical system (multibeam optical scanning apparatus) according to any one of the aforedescribed Embodiments 1 to 4. In FIG. 13, the reference numeral 104 designates the image forming apparatus. Code data Dc is inputted from an external device 117 such as a personal computer to the image forming apparatus 104. This code data Dc is converted into image data (dot data) Di by a printer controller 111 in the apparatus. This image data Di is inputted to the optical scanning unit 100 shown in any one of Embodiments 1 to 4. A light beam (beam) 103 modulated in conformity with the image data Di is emitted from the optical scanning unit (multibeam scanning optical system) 100, and the photosensitive surface of a photosensitive drum 101 is scanned in the main scanning direction by the light beam 103.

The photosensitive drum 101 which is an electrostatic latent image bearing member (a photosensitive member) is clockwisely rotated by a motor 115. With this rotation, the photosensitive surface of the photosensitive drum 101 moves relative to the light beam 103 in the sub scanning direction orthogonal to the main scanning direction. A charging roller 102 for uniformly charging the surface of the photosensitive drum 101 is provided above the photosensitive drum 101 so as to contact with the surface of the latter. The light beam 103 scanned by the optical scanning unit 100 is designed to be applied to the surface of the photosensitive drum 101 charged by the charging roller 102.

As previously described, the light beam 103 is modulated on the basis of the image data Di, and this light beam 103 is applied to the surface of the photosensitive drum 101 to thereby form an electrostatic latent image thereon. This electrostatic latent image is developed as a toner image by a developing device 107 disposed downstream of the applied position of the light beam 103 with respect to the direction of rotation of the photosensitive drum 101 so as to abut against the photosensitive drum 101.

The toner image developed by the developing device 107 is transferred onto a sheet 112 which is a transfer material by a transferring roller (transferring device) 108 disposed below the photosensitive drum 101 so as to be opposed to the photosensitive drum 101. The sheet 112 is contained in a sheet cassette 109 disposed forwardly (at the right as viewed in FIG. 13) of the photosensitive drum 101, and it can also be manually fed. A sheet feeding roller 110 is disposed at one end of the sheet cassette 109, and feeds the sheets 112 in the sheet cassette 109 to a conveying path.

The sheet 112 onto which the unfixed toner image has been transferred in the manner described above is further conveyed to a fixing device disposed rearwardly (at the left as viewed in FIG. 13) of the photosensitive drum 101. The fixing device is comprised of a fixing roller 113 having a fixing heater (not shown) therein and a pressure roller 114 disposed so as to be in pressure contact with the fixing roller 113, and pressurizes and heats the sheet 112 conveyed thereto from the transferring portion by the pressure contact portion between the fixing roller 113 and the pressure roller 114 to thereby fix the unfixed toner image on the sheet 112. Further, delivery rollers 116 are disposed rearwardly of the fixing roller 113, and delivers the fixed sheet 112 out of the image forming apparatus.

Although not shown in FIG. 13, the printer controller 111 effects not only the conversion of the aforedescribed data, but also the control of various portions including the motor 115 in the image forming apparatus and a polygon motor, etc. in the optical scanning unit 100.

According to the present invention, there can be achieved a multibeam scanning optical system in which, as previously described, the relative position of a plurality of beams in the sub scanning direction is adjusted to thereby adjust (or change) the relative imaging position in the sub scanning direction on the surface to be scanned, whereby which is strong against mechanical vibration or the like and suffers little from pitch fluctuation and is excellent in environmental stability, and an image forming apparatus using the same.

Further, according to the present invention, there can be achieved a multibeam scanning optical system in which, as previously described, a laser beam source is comprised of a monolithic multibeam laser having a plurality of light emitting points to thereby cope with requirements for a higher speed and a higher quality of image, and an image forming apparatus using the same.

What is claimed is:

1. A multi-beam scanning optical system comprising:
   a plurality of beam converting means each having a light source and a first optical system for converting a beam emitted from the light source into a divergent beam or a convergent beam;
   deflecting means for reflecting and deflecting the plurality of beams from said plurality of beam converting means in a main scanning direction; and
   a second optical system for causing the plurality of beams reflected and deflected by said deflecting means to be imaged on a surface to be scanned,
   wherein the relative positions of the plurality of beams emerging from said plurality of beam converting means are adjusted in a sub-scanning direction without changing the direction in which the plurality of beams emerge to thereby adjust the relative imaging positions of the plurality of beams in the sub-scanning direction on the surface to be scanned.

2. A multi-beam scanning optical system according to claim 1, further comprising beam combining means for combining the plurality of beams emerging from said plurality of beam converting means, wherein said beam combining means includes a beam combining prism.

3. A multi-beam scanning optical system according to claim 1, wherein the relative positions of the plurality of divergent beams or convergent beams are adjusted by moving at least one of said plurality of beam converting means in the sub-scanning direction.

4. A multi-beam scanning optical system according to claim 1, further comprising adjusting means for adjusting the relative positions of the plurality of beams in the sub-scanning direction to thereby adjust the relative imaging positions of the plurality of beams in the sub-scanning direction on the surface to be scanned.

5. A multi-beam scanning optical system comprising:
   a plurality of beam converting means each having a light source and a first optical system for converting a beam emitted from the light source into a divergent beam or a convergent beam;
   beam combining means for combining a plurality of divergent beams or convergent beams emerging from said plurality of beam converting means;
   a second optical system for causing each of the plurality of divergent beams or convergent beams combined by said beam combining means to be imaged as a linear image long in a main scanning direction;
   deflecting means for reflecting and deflecting the plurality of beams imaged by said second optical system in the main scanning direction; and
   a third optical system for causing the plurality of beams reflected and deflected by said deflecting means to be imaged on a surface to be scanned,
   wherein the relative positions of the plurality of divergent beams or convergent beams imaged by said second optical system are adjusted in a sub-scanning direction without changing the direction in which the plurality of beams emerge from said plurality of beam converting means to thereby adjust the relative imaging positions of the plurality of beams in the sub-scanning direction on the surface to be scanned,
   wherein said beam combining means includes a beam combining prism,
   wherein the relative positions of the plurality of divergent beams or convergent beams imaged by said second optical system are adjusted by rotating said beam combining prism about an axis lying in the main scanning cross section and substantially parallel to the surface to be scanned.

6. A multi-beam scanning optical system according to claim 5, wherein the distances from the principal point of said third optical system on the deflecting means side in the main scanning cross section to the natural converging points of said plurality of divergent beams or convergent beams are equal to each other.

7. A multi-beam scanning optical system according to claim 6, wherein the light source in said plurality of beam converting means is comprised of a monolithic multi-beam laser having a plurality of light emitting points.

8. A multi-beam scanning optical system according to claim 7, wherein an adjustment of the relative imaging positions of the plurality of beams emitted from the plurality of light emitting points of said monolithic multi-beam laser in the sub-scanning direction on the surface to be scanned is effected by rotating said monolithic multi-beam laser about an optical axis.

9. A multi-beam scanning optical system according to claim 3, further comprising adjusting means for adjusting the relative positions of the plurality of divergent beams or convergent beams imaged by said second optical system in the sub-scanning direction to thereby adjust the relative imaging positions of the plurality of beams in the sub-scanning direction on the surface to be scanned.

10. A multi-beam optical scanning apparatus comprising a multi-beam scanning optical system according to any one of claims 1 to 9, wherein said multi-beam scanning optical system is contained in a housing.

11. An image forming apparatus comprising:
- a multi-beam optical scanning apparatus according to claim 10;
- a photosensitive member disposed on the surface to be scanned;
- a developing device for developing as a toner image an electrostatic latent image formed on said photosensitive member by a beam scanned by said multi-beam optical scanning apparatus;
- a transferring device for transferring the developed toner image to a transfer material; and
- a fixing device for fixing the transferred toner image on the transfer material.

12. An image forming apparatus comprising:
- a multi-beam optical scanning apparatus according to claim 10; and
- a printer controller for converting code data input from an external device into an image signal and inputting it to said multi-beam optical scanning apparatus.

* * * * *

UNITED STATES PATENT AND TRADEMARK OFFICE
CERTIFICATE OF CORRECTION

PATENT NO. : 6,731,418 B2
DATED : May 4, 2004
INVENTOR(S) : Yoshihiro Ishibe

It is certified that error appears in the above-identified patent and that said Letters Patent is hereby corrected as shown below:

Column 1,
Line 67, "witch" should read -- which --.

Column 11,
Line 42, "monohithic" should read -- monolithic --.

Column 14,
Line 67, "claim 3," should read -- claim 5, --.

Signed and Sealed this

Twenty-first Day of September, 2004

JON W. DUDAS
*Director of the United States Patent and Trademark Office*